Figure 1:
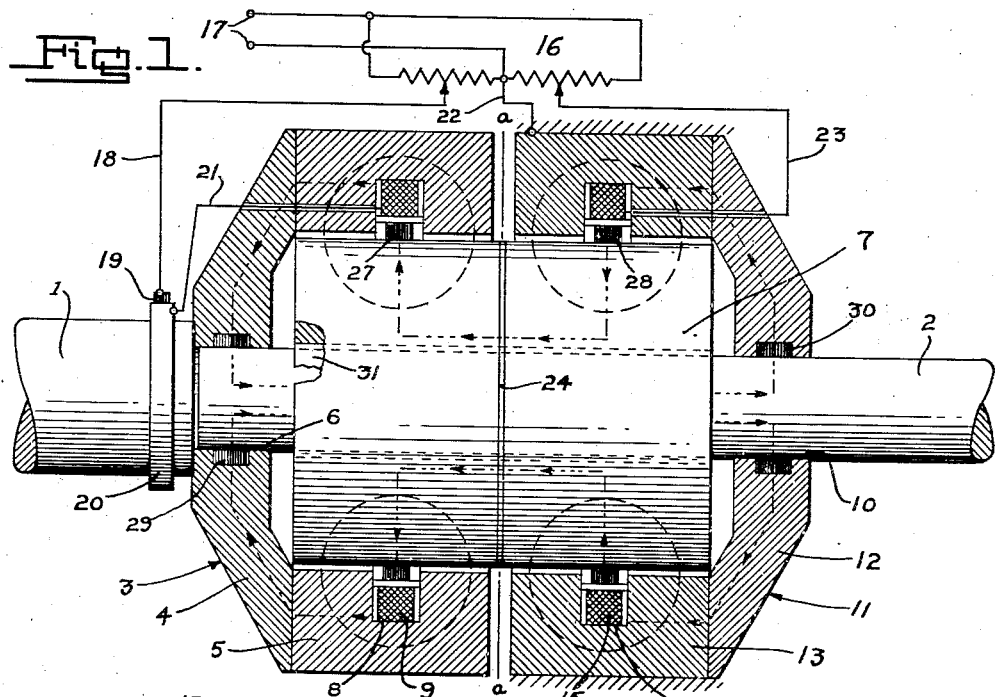

Sept. 24, 1946.　　　　　E. C. LLOYD　　　　　2,408,080
POWER TRANSMISSION DEVICE
Filed Feb. 26, 1942　　　　2 Sheets-Sheet 1

INVENTOR
Edward C. Lloyd.
BY
ATTORNEY

Sept. 24, 1946.  E. C. LLOYD  2,408,080
POWER TRANSMISSION DEVICE
Filed Feb. 26, 1942  2 Sheets-Sheet 2
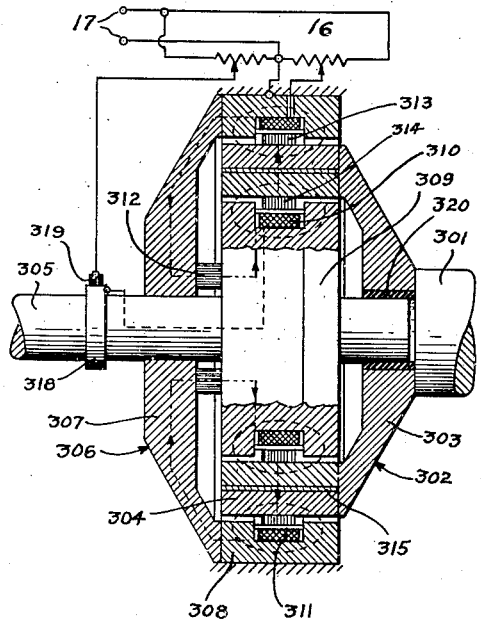
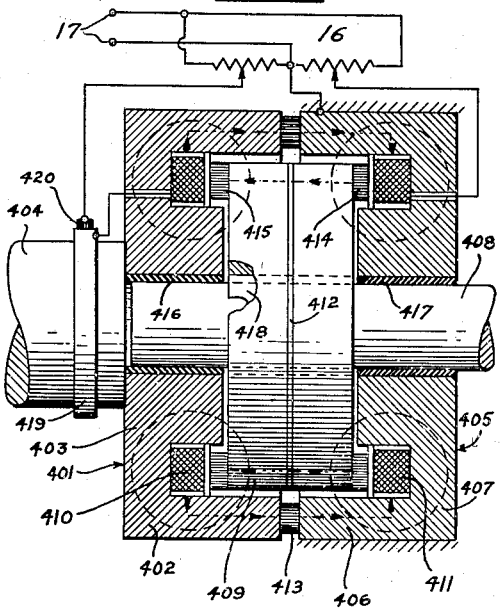
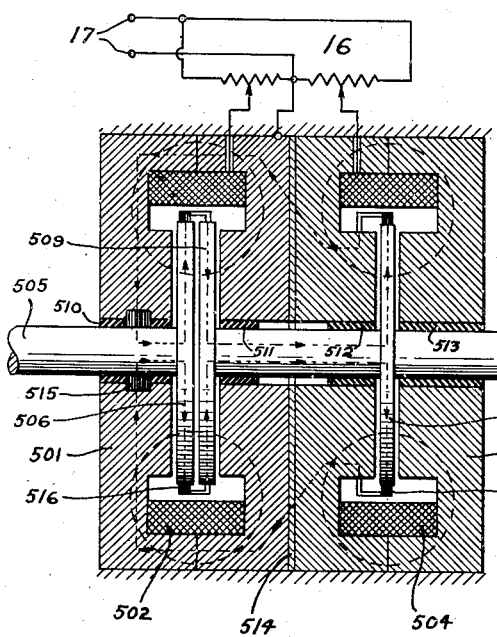
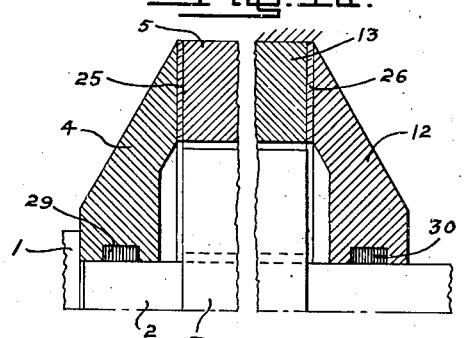
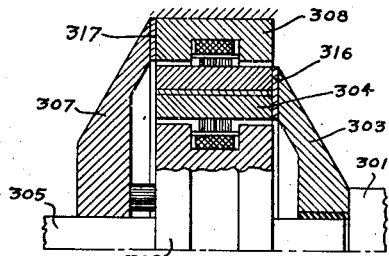
INVENTOR
Edward C. Lloyd.
BY
ATTORNEY

Patented Sept. 24, 1946

2,408,080

UNITED STATES PATENT OFFICE 2,408,080

POWER TRANSMISSION DEVICE

Edward C. Lloyd, Takoma Park, Md.

Application February 26, 1942, Serial No. 432,453

26 Claims. (Cl. 172—284)

(Granted under the act of March 3, 1883, as amended April 30, 1928; 370 O. G. 757)

This invention relates to systems for transmitting mechanical power from a driving member to a driven member through the use of a homopolar dynamo electric machine connected intermediate the driving and driven members.

By means of my invention, homopolar machines of the simplest construction can be utilized, thus providing a power transmission which is economical to manufacture and simple in operation.

One object is to provide an electro-mechanical system of transmitting power from a driving member to a driven member at a high efficiency.

Another object is to provide a power transmission device of the type described in which power from a driving member operating at substantially constant speed and torque may be delivered to a driven member operating at variable speed and torque.

Another object of the invention is to provide a combined generator-motor device of the homopolar type in which part of the power is transmitted from a driving member to a driven member through a magnetic coupling effected between the armature and field members of the generator side of the device; the remainder of such power is transmitted by motor action in the motor side of the device and the current for the motor is supplied from the generator side.

Another object is to provide a dynamo-electric machine for coupling a driving member to a driven member, the machine being a combined generator-motor device of the homopolar type consisting of three members which are rotatable relative to each other on a common axis, one of such members being made stationary. One of the rotatable members is connected to the driven member and is common to both the motor and generator sides of the machine; i. e., one portion of the member acts as an armature or field for the generator side and the other portion acts as an armature or field for the motor side. The other rotatable member is connected to the driving member and acts as the field or armature of the generator side.

A more specific object of the invention is to provide for a combined generator-motor power transmission device of the homopolar type in which the electro-magnetic coupling is provided by action between the armature and field members of the generator portion of the device, both of which are rotatable, and one of which is connected to the driving member; the motor portion consists of a field member and an armature member fed by current from the generator portion, one of the motor members is made stationary and the other is connected to the driven member.

These and other objects of my invention will become apparent from the following detailed description and from the accompanying drawings.

Referring now to the drawings:

Fig. 1 is a longitudinal half section view of one embodiment of the invention; and Figs. 1a, 2, 3, 3a, 4 and 5 are views similar to Fig. 1, illustrating modifications of the structure shown in Fig. 1.

Before describing the structure and operation of the device shown in Fig. 1, it would be well to point out that my improved system of power transmission should not be confused with conventional systems for transmitting power from a driving member to a driven member in which it is customary to provide a generator connected to the driving member for converting all the mechanical power into electrical power and thence reconverting such electrical power to mechanical power by feeding it to a motor connected to the driven member. In the apparatus to be described, the only mechanical power converted to electrical power in the generator is that produced by the difference in speeds of the armature and field members of the generator which constitutes the electro-magnetic or slip coupling portion of the transmission device.

One of the advantages to be derived from the use of my invention is that its efficiency is much higher than the aforementioned conventional system.

For example, in the conventional system, if an efficiency of 90% (which value is a fair figure for electric machines) is assumed for conversion of the entire mechanical power to electrical power, and an efficiency of 90% is similarly assumed for the conversion of such electrical power back into mechanical power, the over-all efficiency of the system will be equal to the product of the component efficiencies, or $90\% \times 90\% = 81\%$.

In my system, however, assuming the ratio between driving and driven members to be substantially 1 to 1, in which case all the power would be transmitted through the electromagnetic coupling, the efficiency of the latter would be the efficiency of the coupling, and a fair value for such efficiency would be at least 90%.

Thus, my system, for substantially a 1 to 1 ratio of transmission, would be much higher than the conventional system. The advantages in increased efficiency of my system of transmission will, however, decrease somewhat as the percentage of mechanical power converted to electrical power increases, such percentage being proportional to the ratio of the difference in speed between the driving and driven members to the speed of the driving member. Thus I have found that for a reduction in speed of the driven member to one-half that of the driving member, the power transmitted from mechanical to electrical power and back to mechanical (assuming the power of the driving and driven members to be substantially equal except for losses) is approximately .5 of the total. Assuming efficiencies of the electro-magnetic transmission at 90% and that of the efficiency of the electrical conversion (mechanical to electrical and back to mechanical) at 81%, the over-all efficiency of my system would be equal to:

$$.5\ (90\%) + .5\ (81\%) = 85.5\%$$

which is still high when compared to a system in which all of the power is converted from mechanical form to electrical and back to mechanical form.

In addition to the better efficiencies to be derived from a device constructed in accordance with my invention, there is a further advantage in that the physical size of a transmission device embodying my invention when utilized for transmitting constant power from a driving shaft operating at substantially constant speed to a driven shaft (having the same power) operating at reduced speeds, is much smaller than a conventional device utilizing total power conversion from mechanical form to electrical form and thence back to mechanical form, such as a Ward Leonard system.

For example, it is well known that for a given power output, the physical size of the armature of a dynamo electric machine, and hence the size of the machine, varies with the speed of the machine in accordance with the equation $$W = kLD^2N$$

where

W = watts
L = length of armature
D = diameter of armature
N = speed in revolutions per minute
k = a constant.

Thus in a conventional system utilizing separate and distinct generator and motor, if the motor is to be run at half the speed of the generator but at the same power, the motor must be twice the size of the generator. In my device, however, I have found out that for the same reduction in speed, ratio 1 to 2, the motor needs to be only the same physical size as the generator, as only about 50% of the power is converted from mechanical to electrical energy and back to mechanical energy.

Referring now to Figs. 1 and 1a, the driving member, in the present embodiment a shaft 1, is journaled for rotation by any well known means, which are not shown. The driven member, in the present embodiment, is also a shaft 2. A bell member 3 is fixed to the end of the shaft 1 for rotation therewith and is provided with a radial portion 4 and an axial portion 5. An opening 6 formed centrally in the radial portion 4 serves to journal a cylindrical member 7 which, as will be hereinafter described, is an armature common to both the motor and generator sides of my device. A circumferential slot 8 is formed in the axial portion 5 for receiving a circumferential field winding 9.

Shaft 2 is journaled for rotation in a central opening 10 in a bell member 11 which is made stationary. The bell member 11 is similar to bell member 3 containing a radial portion 12 and an axial portion 13. A circumferential slot 14 is provided in the axial portion for receiving a circumferential field winding 15.

A source of current supply for field windings 9 and 15 is furnished from a potentiometer 16 connected to a power source 17. Current is led from the potentiometer 16 through conductor 18 to brush 19 which rides on a slip ring 20. A conductor 21 connects slip ring 20 to one side of the field winding 9. The other side is "grounded" to end bell 3, permitting current return to source 17 via bell member 3, shaft 2, bell member 11 and conductor 22. One side of field winding 15 may be similarly connected to the potentiometer 16 by means of conductor 23. The other side is "grounded" to bell member 11. It will be seen that the amount of current supplied to each of the windings 9 and 15 may be varied by adjusting the position of the connecting points of conductors 18 and 23 to potentiometer 16.

The cylindrical member 7 in the present embodiment comprises a cylinder of iron or steel or other material, preferably magnetic, and contains a bore centrally therein so that it may be supported on the shaft 2. A disc 24 of non-magnetic material may be utilized intermediate the ends of cylinder 7 to isolate the field flux produced by winding 9 from that produced by winding 15. Likewise, annular flux barriers 25 and 26 (see Fig. 1a) may be utilized respectively between the radial portion 4 and axial portion 5 of bell member 3, and between the radial portion 12 and axial portion 13 of bell member 11 to confine the field flux produced respectively by windings 9 and 15 to the axial portions 5 and 13 of said bell members. A different way to produce the same result (see Fig. 1) would be to construct the radial portions of each of the bell members of non-magnetic material and the axial portions thereof of magnetic material.

Brushes 27 and 28, preferably circumferential, are arranged to convey current between the cylinder 7 and bell members 3 and 11, and brushes 29 and 30 convey current between bell members 3 and 11 and the shaft 2. This current and its direction of flow will be discussed hereinafter.

The shaft 2 is preferably insulated from the cylinder 7 by means of an insulating sleeve 31.

*Operation*

The power transmitting device in Fig. 1 operates in the following manner:

In general, it may be stated that the portion of the device which is left of the division line a—a acts as a homopolar generator, while that to the right of line a—a acts as a homopolar motor. Thus the "generator" comprises a "field" member 5 and an "armature" member consisting of the left half of cylinder 7, while the "motor" comprises a "field" member 13 and an "armature" member consisting of the right half of cylinder 7. Since in Fig. 1 the radial portions 4 and 12 of bell members 3 and 11 are non-magnetic, and are thus isolated from the magnetic, axial portions thereof, or separated from the axial portions by flux barriers 25 and 26 (Fig. 1a), flux produced by the field windings 9 and 15 when energized will link only the axial portions 5 and 13 with cylinder member 7, as shown by the broken "dash" lines.

If it is desired to operate the transmission device at substantially at 1 to 1 ratio in speed of the driving to driven shafts, and shaft 1 is turning at full speed, shaft 2 may be coupled to shaft 1 through the transmission by gradually energizing the winding 9 by means of the potentiometer 16. As both bell member 3 and cylinder 7 are rotatable, the latter will begin to pick up speed until it is running at a speed slightly under that of the shaft 1. The cylinder 7 is then "electromagnetically" coupled to the bell member 3 and the difference in speeds of the two, often termed the "slip" of the coupling, represents the major portion of the energy loss in the coupling. Rotation of the bell member 3 relative to cylinder 7 generates an E. M. F. in cylinder 7, causing current to flow radially outwardly from cylinder 7, across brush 27, through the axial and radial portions of bell member 3, across brush 29, through shaft 2, across brush 30, through the radial and axial portions of bell member 11, across brush 28 into the motor half of cylinder 7 and across disc 24 to the generator half of cylinder 7. The approximate course of this current is illustrated by broken "dash and dot" lines.

If it is desired to operate my transmission device to transmit a given amount of power from one speed of the shaft 1 to shaft 2 operating at a lower speed, it is obvious that if the power in the driven member is to be made substantially equal to the power in the driving member, the torque of the driven member must be greater than the torque of the driving member, since power varies as the product of torque and speed. This added torque is furnished by exicting field winding 15 which produces "motor" action in the motor half of cylinder 7.

The ratio of speeds of driving to driven members may be varied by regulating the relative field strengths of the windings 9 and 15.

Reverse rotation of the shaft 2 may be obtained by reversing the direction of current flow in winding 15 and reducing current flow through winding 9.

While, in the present embodiment, the "field" member of the generator half is the axial portion 5 of bell member 3 and the "armature" is the left half of cylinder 7, it will be obvious that a similar result would be obtained by placing winding 9 on cylinder 7, in which case the latter would become the "field" member of the generator while the axial portion of bell member 3 would then become the "armature" member of the generator. Similar reversal of parts could likewise be made in the motor side of my device without departing from the spirit and scope of my invention.

Figure 2:
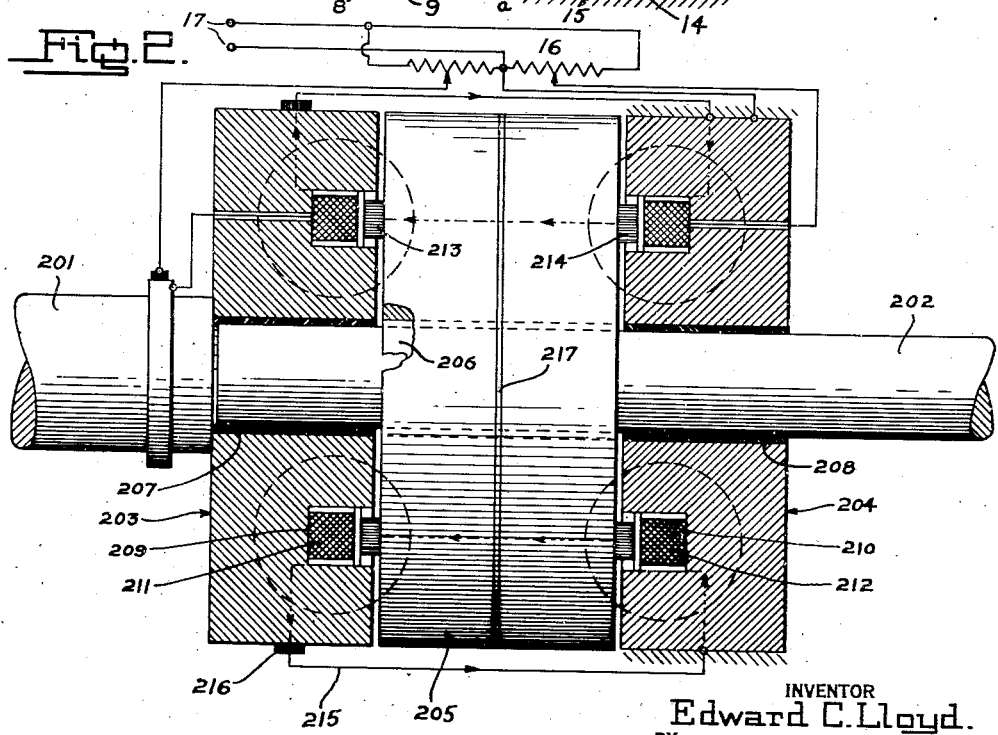

In the modification shown in Fig. 2, there is illustrated an embodiment of my invention which is extremely simple in construction. A drive shaft 201 has connected to the end thereof an annulus 203 of magnetic material constituting a generator "field" member. A driven shaft 202 is journaled in a stationary annulus 204 of magnetic material constituting the motor "field" member and supports a cylindrical member 205. Cylinder 205 is insulated from shaft 202 by an insulating sleeve 206. Sleeves 207 and 208 of non-magnetic material are provided between the generator and motor field members and shaft 202.

The cylindrical member 205 constitutes an "armature" member common to both motor and generator.

Recesses 209 and 210 are provided respectively in the inner faces of the generator and motor field members 203 and 204 for receiving windings 211 and 212. These windings may be supplied with current in a manner similar to that shown and described with respect to the structure of Fig. 1. Annular brushes 213 and 214 are provided for conveying current between the armature and field members of the motor and generator, and an external connector 215 and brush 216 connecting field member 203 with field member 204 completes the circuit for current flow between the generator and motor sides of the device. If desired, a flux barrier 217 of non-magnetic material may divide the generator half of the armature member 205 from the motor half thereof.

The device in Fig. 2 operates in a manner similar to that in Fig. 1 and the positions of the field and armature members of the generator and/or motor members may be similarly reversed; that is, winding 211 and/or winding 212 may be placed in suitable recesses provided in the cylindrical member 205. Its utter simplicity may make its use desirable in some installations when the total power to be transmitted from the driving to the driven shaft is of a low order. However, with a higher order of power, it would appear that axial thrust between the end faces of members 203 and 204 and the end faces of member 205 may be of such magnitude as to make this particular embodiment impractical.

The modification illustrated in Fig. 3 is particularly adapted for installations where space axially is at a premium. A driven shaft 301 has connected to the end thereof a bell member 302 having a radial portion 303 and an axial portion 304. Bell member 302 rotates with the driven shaft 301 and constitutes an "armature" common to both the motor and generator sides of the device. A driving shaft 305 is journaled in a secondary stationary bell member 306 having a radial portion 307 and an axial portion 308 which forms the "field" member for the motor. Shaft 305 supports a cylindrical member 309 which carries an annular winding 310 in a recess therein and constitutes the generator "field" member.

The stationary bell member 306 is also provided with a recess within which an annular winding 311 is located and constitutes the motor "field" member.

Brushes 312, 313, and 314, which may be annular, are provided for conveying current between the motor and generator sides of the device. Field flux is illustrated by broken "dash" lines and direction of current flow is indicated by broken "dash and dot" lines.

In order to isolate the flux produced by the generator field winding 310 from that produced by the motor field winding 311, an annulus of non-magnetic material 315 may be inserted in the axial portion 304 of bell member 302. If radial portions 303 and 307 are of non-magnetic material, the motor and generator field fluxes will be confined to the axial portions 304 and 308. However, if made of magnetic material, annuli 316 and 317 of non-magnetic material (see Fig. 3a) may be inserted at the juncture between the radial portion 303 and axial portion 304 of bell member 302, and between the radial portion 307 and axial portion 308 of bell member 306.

The field windings 310 and 311 may be energized in a manner similar to the arrangement shown in Fig. 1, one side of each winding being "grounded" to the field structure. The lead to winding 310 may be connected by means of slip ring 318 and brush 319, a bore being provided in the shaft 305 and cylinder 309. Insulating sleeve 320 is provided.

The modification illustrated in Fig. 4 is somewhat similar to that in Fig. 1, the principal difference being in the direction of the field flux paths. In Fig. 1, the path for field flux is radial, whereas in Fig. 4, the path is both radial and axial.

In Fig. 4, a bell member 401 having an axial portion 402 and a radial portion 403 is suitably connected to the end of a driving shaft 404 and constitutes the generator "field" member. A second stationary bell member 405 having an axial portion 406 and a radial portion 407 constitutes the motor "field" member.

A driven shaft 408 is journaled in bell members 401 and 405, and carries a cylindrical member 409 which constitutes an "armature" member common to both the generator and motor sides of the device.

A recess is provided in bell member 401 to receive an annular winding 410 and a similar recess is provided in bell member 405 to receive an annular winding 411.

A flux barrier 412 of non-magnetic material inserted medially in the armature member 409 may be utilized to isolate the flux produced by winding 410 from that produced by winding 411.

Brushes 413, 414 and 415 convey current between the motor and generator sides of the transmission device. Sleeves 416 and 417 of non-magnetic material confine generator and motor field flux to their proper paths. A sleeve 418 of insulating material may be utilized to confine the flow of current between motor and generator to its proper path.

As in the other modifications, current may be supplied to coil 410 by means of a slip ring 419 and associated brush 420, and one side of each of the coils 410 and 411 may be "grounded" to their respective field structures.

As will be seen from the drawings, both radial and axial flux paths are provided, as indicated by broken "dash" lines, and current flow between motor and generator sides of the device is indicated by the broken "dash and dot" lines.

The modification illustrated in Fig. 5 differs principally from the other modifications by the fact that both the motor and generator field windings are made stationary. In this modification, member 501 is provided with an internal recess for housing a generator field winding 502. A similar member 503 is provided with a recess for supporting a motor field winding 504.

A drive shaft 505 is journaled within the member 501 and carries a disc 506 at the end thereof which constitutes the armature member for the generator. A driven shaft 507 is journaled within members 501 and 503. One disc 508 constituting the armature member for the motor side of the device, is fastened by suitable means, such as keying, to the driven shaft 507 and operates between the pole pieces of member 503 formed by the adjacent faces forming the cylindrical recess therein. Another disc member 509 is secured to the end of shaft 507 and operates within the similar cylindrical recessed portion in member 501 and adjacent to disc member 506.

Insulating sleeves 510, 511, 512 and 513 may be utilized intermediate the shafts 505 and 507, and the motor and generator stationary field members 501 and 503, and a non-magnetic separator 514 may be utilized to isolate the flux produced by winding 502 from that produced by winding 504.

Brushes 515, 516 and 517 convey current between the motor and generator sides of the device.

The path for the generator field flux is illustrated by broken "dash" lines and the path for current flow by broken "dash and dot" lines.

Field windings 502 and 504 may be connected to a source of power in a manner similar to that in Fig. 1, using the field members 501 and 503 as part of the conductive path. However, no slip rings are, of course, necessary here, as both windings are stationary.

In operation, as the disc 506 is rotated by the drive shaft 505, and E. M. F. is generated therein, causing current to flow radially therefrom which passes into disc 509 (carried by driven shaft 507) and causes the latter to rotate. These two discs thus constitute a slipping magnetic clutch arrangement. The current enters shaft 507 from disc 509 and passes over to the motor side and radially through disc 508. The current returns to the generator side through field members 503 and 501.

In conclusion, it will be evident that various changes and modifications in addition to those which have already been suggested, may be made in my invention without departing from the spirit and scope thereof, and accordingly, I desire it to be understood that only such limitations as are necessitated by the prior art should be made upon the claims appended thereto.

The invention described herein may be manufactured and used by or for the Government of the United States of America for governmental purposes without the payment of any royalties thereon or therefor.

Having thus fully described my invention, what I claim is:

1. A combined generator-motor device of the unipolar type for transmitting power from a driving member to a driven member comprising a cylindrical member, one portion of which constitutes a generator member and the other portion constituting a motor member, said cylindrical member being connected to said driven member, an annular generator member, said generator member being connected to said driving member for rotation thereby and being disposed so that the axial portion thereof houses substantially the generator portion of said cylindrical member, a stationary annular motor member, said motor member being disposed so that the axial portion thereof houses substantially the motor portion of said cylindrical member, a field winding disposed in one of said generator members, a field winding disposed in one of said motor members, and means for conveying current between the generator and motor sides of said device.

2. A combined generator-motor device of the unipolar type for transmitting power from a driving member to a driven member comprising a generator member connected to said driving member, a stationary motor member, said members having radially and axially extending face portions, a cylindrical member one portion of which constitutes a second generator member and the other portion constituting a second motor member, said cylindrical member being connected to said driven member and being disposed intermediate said first mentioned generator and motor members so that the axial face of said cylindrical member forms radially extending air gaps respectively with the axial face portions of said first mentioned generator and motor members for the passage of generator and motor field flux respectively to and from said cylindrical member, a generator field flux winding disposed in one of said generator members, a motor field flux winding disposed in one of said motor members, and means for conveying current between the generator and motor sides of said device.

3. A combined generator-motor device of the unipolar type for transmitting power from a driving member to a driven member comprising a generator member connected to said driving member, a stationary motor member, said members having radially and axially extending portions, a cylindrical member, one part of which constitutes a second generator member and the other part constitutes a second motor member, said cylindrical member being connected to said driven member and being disposed intermediate said first mentioned generator and motor members so that the axial face of said cylindrical member forms radially extending air gaps respectively with the axial portions of said first mentioned generator and motor members for the passage of generator and motor field flux respectively to and from said cylindrical member, a generator field flux winding disposed in one of said generator members, a motor field flux winding disposed in one of said motor members, means for conveying current between the generator and motor sides of said device, flux barrier means disposed at substantially the juncture between said radially and axially extending portions of said first mentioned generator and motor members, and flux barrier means disposed between the generator and motor parts of said cylindrical member.

4. A combined generator-motor device of the unipolar type for transmitting power from a driving member to a driven member comprising a generator field member connected to said driving member, a stationary motor field member, said field members having radially and axially extending portions, a cylindrical member, one part of which constitutes a generator armature member and the other part constituting a motor armature member, said cylindrical member being connected to said driven member and being disposed intermediate said generator and motor field members so that the axial face of said cylindrical member forms radially extending air gaps respectively with the axially extending portions of said generator and motor field members for the passage of generator and motor field flux respectively to and from said cylindrical member, a generator field flux winding disposed in the axially extending portion of said generator field member, a motor field flux winding disposed in the axially extending portion of said motor field member, and means for conveying current between the generator and motor sides of said device.

5. A combined generator-motor device of the unipolar type for transmitting power from a driving member to a driven member comprising a generator field member connected to said driving member, a stationary motor field member, said field members having radially and axially extending portions, a cylindrical member, one part of which constitutes a generator armature member and the other part constituting a motor armature member, said cylindrical member being connected to said driven member and being disposed intermediate said generator and motor field members so that the axial face of said cylindrical member forms radially extending air gaps respectively with the axially extending portions of said generator and motor field members for the passage of generator and motor field flux respectively to and from said cylindrical member, a generator field flux winding disposed in the axially extending portion of said generator field member, a motor field flux winding disposed in the axially extending portion of said motor field member, flux barrier means disposed at substantially the juncture between said radially and axially extending portions of said generator and motor field members, flux barrier means disposed between the generator and motor parts of said cylindrical armature member, and means for conveying current between the generator and motor sides of said device.

6. A combined generator-motor device of the unipolar type for transmitting power from a driving member to a driven member comprising a generator field member connected to said driving member, a stationary motor field member, each of said field members having a non-magnetizable radially extending portion and a magnetizable axially extending portion, a cylindrical member, one part of which constitutes a generator armature member and the other part constituting a motor armature member, said cylindrical member being connected to said driven member and being disposed intermediate said generator and motor field members so that the axial face of said cylindrical member forms radially extending air gaps respectively with the axially extending portions of said generator and motor field members for the passage of generator and motor field flux respectively to and from said cylindrical member, a generator field flux winding disposed in the axially extending portion of said generator field member, a motor field flux winding disposed in the axially extending portion of said motor field member, flux barrier means disposed between the generator and motor parts of said cylindrical armature member, and means for conveying current between the generator and motor sides of said device.

7. A combined generator-motor device of the unipolar type for transmitting power from a driving member to a driven member comprising a cylindrical generator member connected to said driving member for rotation thereby, a second cylindrical stationary motor member, a third cylindrical member, one part of which constitutes a generator member and the other part of which constitutes a motor member, said third cylindrical member being connected to said driven member and being disposed intermediate said first mentioned motor and generator members so that the end faces of said third cylindrical member and the inner end faces of said first mentioned motor and generator members form axially extending air gaps for the passage of field flux axially to and from said third cylindrical member, a field flux winding disposed in one of said generator members, a field flux winding disposed in one of said motor members, and means for conveying current between the generator and motor sides of said device.

8. A combined generator-motor device of the unipolar type for transmitting power from a driving member to a driven member comprising a cylindrical generator member connected to said driving member for rotation thereby, a second cylindrical stationary motor member, a third cylindrical member, one part of which constitutes a generator member and the other part constituting a motor member, said third cylindrical member being connected to said driven member and being disposed intermediate said first mentioned generator and motor members so that the end faces of said third cylindrical member and the inner end faces of said first mentioned generator and motor members form an axially extending air gap for the passage of field flux axially to and from said third cylindrical member, an annular field flux winding disposed in one of said generator members, an annular field flux winding disposed in one of said motor members, means for journaling said third cylindrical member in said first mentioned cylindrical generator and motor members, and means for conveying current between the generator and motor sides of said device.

9. A combined generator-motor device of the unipolar type for transmitting power from a driving member to a driven member comprising a cylindrical generator field member connected to said driving member for rotation thereby, a second cylindrical stationary motor field member, a third cylindrical armature member common to both motor and generator having a diameter not substantially less than the diameter of said field members throughout its axial length, said armature member being connected to said driven member and being disposed intermediate said field members so that the end faces of said armature member and the inner end faces of said field members form axially extending air gaps for the passage of field flux axially between said field members and said armature member, a field flux winding for each of said field members, and means for conveying current between the generator and motor sides of said device.

10. A combined generator-motor device of the unipolar type for transmitting power from a driving member to a driven member comprising a cylindrical generator field member connected to said driving member for rotation thereby, a stationary cylindrical motor field member, a cylindrical armature member common to both motor and generator having a diameter not substantially less than the diameter of said field members throughout its axial length, said armature member being connected to said driven member and being disposed intermediate the field members so that the end faces of said armature member and the inner end faces of said field members form axially extending air gaps for the passage of field flux axially between said fields and said armature member, means providing recesses respectively in the inner end faces of said field members, a field flux winding disposed in each said recess, and means for conveying the current between the generator and motor sides of said device.

11. A combined generator-motor device of the unipolar type for transmitting power from a driving member to a driven member comprising a cylindrical generator field member connected to said driving member for rotation thereby, a stationary cylindrical motor field member, a cylindrical armature member common to both motor and generator having a diameter not substantially less than the diameter of said field members throughout its axial length, said armature being connected to said driven member and being disposed intermediate said field members so that the end faces of said armature member and the inner end faces of said field members form axially extending air gaps for the passage of field flux axially between said field members and said armature member, a field flux winding for each of said field members, means for conveying current between the generator and motor sides of said device, and flux barrier means disposed intermediate the end faces of said armature member to isolate the flux produced by the generator field winding from that produced by the motor field winding.

12. A combined generator-motor device of the unipolar type for transmitting power from a driving member to a driven member comprising a cylindrical generator field member connected to said driving member for rotation thereby, a stationary cylindrical motor field member, a cylindrical armature member common to both motor and generator and having a diameter not substantially less than the diameter of said field members throughout its axial length, said armature being connected to said driven member and being disposed intermediate said field members so that the end faces of said armature member and the inner end faces of said field members form axially extending air gaps for the passage of field flux axially between said field members and said armature member, a field flux winding for each of said field members, means for journaling said armature member in said field members, means for conveying current between the generator and motor sides of said device, flux barrier means disposed intermediate the end faces of said armature member to isolate the flux produced by the generator field winding from that produced by the motor field winding, and flux barrier bushing means associated with said journal means.

13. A combined generator-motor device of the unipolar type for transmitting power from a driving member to a driven member comprising an annular generator field member connected to said driving member for rotation thereby, an annular stationary field member, a cylindrical armature member common to both motor and generator and having a diameter not substantially less than the diameter of said field members throughout its axial length, said armature being connected to said driven member and being disposed intermediate said field members so that the end faces of said armature member and the inner end faces of said field members form axially extending air gaps for the passage of field flux axially between said field members and said armature member, each of said annular field members having a recess in its inner face located intermediate the inner and outer peripheries thereof, a field flux winding disposed in each said recess, means for journaling said armature member in said field members, means for conveying current between the generator and motor sides of said device, flux barrier means disposed intermediate the end faces of said armature member to isolate the flux produced by the generator field winding from that produced by the motor field winding, and flux barrier bushing means associated with said journal means.

14. A combined generator-motor device of the unipolar type for transmitting power from a driving member to a driven member comprising a stationary end bell having radial and axial portions, said axial portion constituting a motor member, a second end bell having radial and axial portions, said axial portion constituting both a motor member and a generator member and being disposed to rotate within the axial portion of said stationary end bell, the inner surface of the axial portion of said stationary end bell and the outer surface of the axial portion of said second end bell defining a radially extending airgap, means for connecting said second end bell to said driven member, a cylindrical generator member connected to said driving member and being disposed to rotate within the axial portion of said second end bell, the inner surface of the axial portion of said second end bell and the axial surface of said cylindrical generator member defining a radially extending airgap, a generator field winding disposed in one of said generator members, a motor field winding disposed in one of said motor members, and means for conveying current between the generator and motor sides of said device.

15. A combined generator-motor device of the unipolar type for transmitting power from a driving member to a driven member comprising a stationary end bell having radial and axial portions, said axial portion constituting a motor field member, a second end bell having radial and axial portions, said axial portion constituting an armature member common to both motor and generator and being disposed to rotate within the axial portion of said stationary end bell, the inner surface of the axial portion of said stationary end bell and the outer surface of the axial portion of said second end bell defining a radially extending airgap, means for connecting said second end bell to said driven member, a generator field member connected to said driving member and being disposed to rotate within the axial portion of said second end bell, the inner surface of the axial portion of said second end bell and the axial surface of said generator field member defining a radially extending airgap, a field winding for each of said field members, and means for conveying current between the generator and motor sides of said device.

16. A combined generator-motor device of the unipolar type for transmitting power from a driving member to a driven member comprising a stationary end bell having radial and axial portions, said axial portion constituting a motor field member, a second end bell having radial and axial portions, said axial portion constituting an armature member common to both motor and generator and being disposed to rotate within the axial portion of said stationary end bell, means for connecting said second end bell to said driven member, a generator field member connected to said driving member and being disposed to rotate within the axial portion of said second end bell, a field winding for each of said field members, means for conveying current between the generator and motor sides of said device, and flux barrier means disposed intermediate the inner and outer peripheries of the axial portion of said second end bell to isolate the flux produced by the motor field winding from that produced by the generator field winding.

17. A combined generator-motor device of the unipolar type for transmitting power from a driving member to a driven member comprising a stationary end bell having radial and axial portions, said axial portion constituting a motor field member, a second end bell having radial and axial portions, said axial portion constituting an armature member common to both motor and generator and being disposed to rotate within the axial portion of said stationary end bell, means for connecting said second end bell to said driven member, a generator field member connected to said driving member and being disposed to rotate within the axial portion of said second end bell, a field winding for each of said field members, means for conveying current between the generator and motor sides of said device, flux barrier means disposed intermediate the inner and outer peripheries of the axial portion of said second bell to isolate the flux produced by the motor field winding from that produced by the generator field winding, and flux barrier means disposed at substantially the juncture between the radial and axial portions of said end bells to confine the flux to said axial portions.

18. A combined generator-motor device of the unipolar type for transmitting power from a driving member to a driven member comprising a stationary end bell having radial and axial portions, said axial portion constituting a motor field member, a second end bell having radial and axial portions, said axial portion constituting an armature member common to both motor and generator and being disposed to rotate within the axial portion of said stationary end bell, means for connecting said second end bell to said driven member, a generator field member connected to said driving member and being disposed to rotate within the axial portion of said second end bell, a field winding for each of said field members, means for journaling said generator field member in said end bells, and means for conveying current between the generator and motor sides of said device.

19. A combined generator-motor device of the unipolar type for transmitting power from a driving member to a driven member comprising a stationary end bell having radial and axial portions, said axial portion constituting a motor field member, a second end bell having radial and axial portions, said axial portion constituting an armature member common to both motor and generator and being disposed to rotate within the axial portion of said stationary end bell, means for connecting said second end bell to said driven member, a generator field member connected to said driving member and being disposed to rotate within the axial portion of said second end bell, a field winding for each of said field members, means for journaling said generator field member in said end bells, means for conveying current between the generator and motor sides of said device, flux barrier means disposed intermediate the inner and outer peripheries of the axial portion of said second end bell to isolate the flux produced by the motor field winding from that produced by the generator field winding, and flux barrier means disposed at substantially the juncture between radial and axial portions of said end bells to confine the field flux to said axial portions.

20. A combined generator-motor device of the unipolar type for transmitting power from a driving member to a driven member comprising a stationary end bell motor field member, said field member having a non-magnetizable radial portion and a magnetizable axial portion, a motor field winding in the axial portion thereof, a second end bell member constituting an armature member common to both motor and generator, said second end bell having a non-magnetizable radial portion and a magnetizable axial portion, said axial portion being disposed to rotate within the axial portion of said stationary end bell, means for connecting said second end bell to said driven member, a generator field member connected to said driving member and being disposed to rotate within the axial portion of said second end bell, a field winding for said generator field member, means for journaling said generator field member in said end bell members, means for conveying current between the generator and motor sides of said device, and flux barrier means disposed intermediate the inner and outer peripheries of the axial portion of said second end bell to isolate the flux produced by the motor field winding from that produced by the generator field winding.

21. A combined generator-motor device of the unipolar type for transmitting power from a driving member to a driven member comprising a generator member connected to said driving member, a stationary motor member, said generator and motor members having radially and axially extending face portions, a cylindrical member, a portion of which constitutes a second generator member and a portion of which constitutes a second motor member, said cylindrical member being connected to said driven member and being disposed intermediate said first mentioned generator and motor members so that the end and axial faces of said cylindrical member form axially and radially extending air gaps respectively with the end and axial face portions of said first mentioned generator and motor members for the passage of field flux to and from said cylindrical member, a generator field flux winding disposed in one of said generator members, a motor field flux winding disposed in one of said motor members, and means for conveying current between the generator and motor sides of said device.

22. A combined generator-motor device of the unipolar type for transmitting power from a driving member to a driven member comprising a generator field member connected to said driving member for rotation thereby, said generator field member including radially and axially extending face portions, a stationary motor field member including radially and axially extending portions, a field flux winding for each of said field members, a cylindrical armature member common to both motor and generator, said cylindrical member being connected to said driven member and being disposed intermediate said generator and motor field members so that the end and axial faces of said cylindrical member form axially and radially extending air gaps respectively with the end and axial face portions of said generator and motor field members for the passage of field flux to and from said cylindrical member, and means for conveying current between the generator and motor sides of said device.

23. A combined generator-motor device of the unipolar type for transmitting power from a driving member to a driven member comprising an annular generator field member connected to said driving member for rotation thereby, said generator field member including radially and axially extending face portions, a stationary motor field member including radially and axially extending face portions, a field flux winding for each of said field members, a cylindrical armature member common to both motor and generator, means for journaling said armature member in said field members, said cylindrical member being connected to said driven member and being disposed intermediate said generator and motor field members so that the end and axial faces of said cylindrical member form axially and radially extending air gaps respectively with the end and axial face portions of said generator and motor field members for the passage of field flux to and from said armature member, means for conveying current between the generator and motor sides of said device, flux barrier means disposed in said generator and motor field members, and flux barrier means disposed intermediate the end faces of said armature member to isolate the field flux produced by said generator field winding from that produced by said motor field winding.

24. A combined generator-motor device of the unipolar type for transmitting power from a driving member to a driven member comprising a stationary generator field member having a bore extending axially therethrough and a concentric recessed portion extending normal to said bore, a driving shaft, said shaft being extended into the bore in said field member and including a disc member connected thereto for rotation within said recessed portion, said disc member constituting the armature member for said generator, a stationary motor field member having a bore extending axially therethrough and a concentric recessed portion extending normal to said bore, a driven shaft, said driven shaft being extended through the bore in said motor field member into the bore in said generator field member, a second disc member connected to said driven shaft for rotation within the recessed portion in said generator field member adjacent said first mentioned disc member, a third disc member connected to said driven shaft and arranged for rotation within the recessed portion in said motor field member to constitute the motor armature member, a field winding for each of said field members, and means for conveying current between the generator and motor sides of said device.

25. The combination in claim 24 including nonmagnetic flux barrier means disposed between said generator and motor field members to isolate the flux produced by said generator field winding from that produced by said motor field winding.

26. A combined generator-motor device of the unipolar type for transmitting power from a driving member to a driven member comprising a cylindrical generator member connected to said driving member, a first annular member surrounding said cylindrical member, the axial surface portion of said cylindrical generator member and the inner surface of said first annular member defining a radially extending airgap, said first annular member constituting both a motor member and a generator member, a second annular motor member, said second annular member being stationary and surrounding said first annular member, the outer surface of said first annular member and the inner surface of said second annular motor member defining a radially extending airgap, means for operatively connecting said first annular member to said driven member, a generator field winding disposed in one of said generator members, a motor field winding disposed in one of said motor members, and means for conveying current between the generator and motor sides of the device.

EDWARD C. LLOYD.